(12) United States Patent
Johnson et al.

(10) Patent No.: US 7,360,098 B2
(45) Date of Patent: Apr. 15, 2008

(54) PROCESS FOR MANAGING AND AUTHORIZING RIGHTS IN A COMPUTER SYSTEM

(75) Inventors: Woodrow W. Johnson, Marblehead, MA (US); Christine J. Atkins, Lagrange, IL (US); Jon A. Yoh, Peabody, MA (US); Thomas M. Parece, Tewksbury, MA (US)

(73) Assignee: Copyright Clearance Center, Inc., Danvers, MA (US)

( * ) Notice: Subject to any disclaimer, the term of this patent is extended or adjusted under 35 U.S.C. 154(b) by 658 days.

(21) Appl. No.: 11/012,917

(22) Filed: Dec. 15, 2004

(65) Prior Publication Data

US 2005/0102532 A1 May 12, 2005

Related U.S. Application Data

(60) Continuation of application No. 10/617,557, filed on Jul. 11, 2003, now Pat. No. 6,859,880, which is a division of application No. 09/370,953, filed on Aug. 10, 1999, now Pat. No. 6,618,808, which is a continuation of application No. 08/625,905, filed on Apr. 1, 1996, now Pat. No. 5,991,876.

(51) Int. Cl.
*G06F 9/00* (2006.01)

(52) U.S. Cl. .................... 713/189; 713/193; 713/168

(58) Field of Classification Search ............... 713/189, 713/168, 193
See application file for complete search history.

(56) References Cited

U.S. PATENT DOCUMENTS

| 5,291,596 A | * | 3/1994 | Mita ........................... 707/8 |
| 5,629,980 A | * | 5/1997 | Stefik et al. ................. 705/54 |
| 5,715,403 A | * | 2/1998 | Stefik ........................ 705/44 |

* cited by examiner

*Primary Examiner*—Thomas R. Peeso
(74) *Attorney, Agent, or Firm*—Law Offices of Paul E. Kudirka

(57) ABSTRACT

A process for managing and authorizing rights in a computer system accounts for the dynamic, multi-dimensional, and granular nature of rights. A database structure divides works and rights into two related tables. A works table includes information sufficient to identify works managed by the system, while a rights table identifies a right associated with a work and includes one or more date fields delimiting the right. The rights table may also include type of use information. Additional tables, such as a work relation table, a party table, or an order table, may be provided. The process involves managing and querying the database structure and has broad applicability to intellectual, real, and personal property; contract management; and similar items. The process may be performed in a computer system operating in standalone mode, client/server mode, or over the Internet.

44 Claims, 7 Drawing Sheets

PROCESS FOR MANAGING AND AUTHORIZING RIGHTS IN A COMPUTER SYSTEM

RELATED APPLICATIONS

This is a continuation application of application Ser. No. 10,617,557 which was filed on Jul. 11, 2003 now U.S. Pat. No. 6,859,880 by Woodrow W. Johnson, Christine J. Atkins, Jon Yoh and Thomas M. Parece entitled "A Process For Managing And Authorizing Rights In A Computer System" which is a divisional of application Ser. No. 09/370,953 which was filed on Aug. 10, 1999, now U.S. Pat. No. 6,618,808, which is a continuation of application Ser. No. 08/625,905, filed Apr. 1, 1996, now U.S. Pat. No. 5,991,876.

FIELD OF THE INVENTION

The present invention relates to an electronic rights management and authorization system and, in particular, to a process for managing rights and authorizing uses of intellectual property rights, real property interests, contract interests, and similar items.

BACKGROUND OF THE INVENTION

Various organizations participate in the activity of rights management. Municipalities maintain title offices in which the ownership of real property is recorded. Federal and state governments maintain offices for the registration and recording of intellectual property rights, including rights in patents, trademarks, copyrights, and mask works. Collective rights organizations serve as clearinghouses for licensing various works. Two well-known collective rights organizations are the American Society of Composers, Authors and Publishers (ASCAP) and Broadcast Music Incorporated (BMI). The assignee of the present invention, Copyright Clearance Center, Inc. (CCC), is a third collective rights organization. Several other similar organizations exist, including stock photography agencies and multimedia licensing groups.

A variety of schemes for managing rights have been devised. An early technique, which continues to be used by many, is the use of index cards. Each card represents and identifies a unique item or work indexed by the system, such as a tract of land, a patent, or a publication. Information associated with each item or work may be added to the cards. Thus, for a tract of land, one may include the owner; for a patent, the assignee of the patent; and for a publication, its author. Other information is often associated with each card.

With the advent of computing, most index card systems have been translated to electronic form. Electronic systems capture the information previously collected on index cards and organize this information into flat-file or relational databases. Flat-file databases consist of one file, which contains one record for each unique item or work. For example, prior art systems organize real property interests in systems that include one record for each tract of land within a county's boundaries. Other prior art systems for land management include one record for each transaction that has occurred within a county's boundaries.

Relational databases contain at least two database files. For example, literary works are managed in prior art systems that include a first database file with an entry for each work, linked to a second database file with author information. To the extent that any author wrote multiple works, the use of the second database file saves storage space. However, these and other prior art electronic rights management systems do not offer functional advantages over the index card system other than in the time it takes to perform a search and in the physical storage constraints of the system.

In particular, prior art systems fail to address three concerns that have become increasingly apparent in the context of digital and multimedia works. First, rights are dynamic. For example, a periodical may be published by a first publisher and later acquired by a second publisher. The second publisher may, for example, permit duplication of materials from the last twelve months for a base fee plus $1.25 per page, while materials from a prior year are at a lower base fee plus 25¢ per page. The first publisher may retain rights to materials prior to a particular date. An effective rights authorization system should recognize the different publishers as well as the time-based rate changes inherent in the second publishers pricing. It should also permit this information to be altered over time.

Second, rights are often not one dimensional. Several types of use may be permissible for different items or works. Some types of use may also foreclose others, such as a one-time grant of an exclusive right. For published works, rights include the traditional copyright rights, each of which is infinitely divisible. The reproduction right may be licensed at different rates for different customers (e.g., educational, not-for-profit, or commercial user rates), for different media of use (e.g., paper, CD-ROM, intranet, or Internet), for different volumes of use (e.g., one copy, several copies, or an unlimited number of copies), and for different times (e.g., a particular year). These types of use may further be subject to retained rights (attribution, reversion, "moral" and the like) of the author in certain jurisdictions. An effective rights authorization system should be capable of recognizing these types of use and/or restrictions.

Third, items or works are granular. A journal contains many articles, each of which may have different ownership, use, and pricing parameters. A particular article may have subcomponents with different characteristics, such as embedded photographs, illustrations, and charts. For example, a potential licensee interested only in a photograph that appears in an article may find that rights to the photograph are retained by the photographer and are not available, or that rights to the photograph are available independent of, and on different terms than, rights to the entire article. A granter of rights may also combine various items or works into different packages. A publisher may price rights to a collection of ten journals at a reduced rate. A potential licensee interested in the two most-popular journals may find this pricing option attractive, while a potential licensee interested in two lesser-known journals (already priced at low individual rates) may find this option unattractive. In either case, an effective rights authorization system should be flexible and allow granularities.

These concerns are not limited to new media works. Similar problems arise, for example, in the context of managing real property. The problem of time variability is reflected in the illustrative situation where the owner of a parcel of land offers the parcel for lease, with the subsequent lessee then offering the land for sublet at a first rate for commercial use and at a second rate for non-profit use, both rates escalating over time. Type of use and granularity may also be involved. The owner of adjoining beach-front properties may offer an easement to the set. This involves a type of use other than ownership, with a granularity of more than one parcel of land. An effective rights management and authorization system should recognize these complex arrangements.

SUMMARY OF THE INVENTION

The present invention provides a process for managing and authorizing rights in a computer system. With the present invention, clearinghouse functions may be provided, while accounting for the problems of time variability, type of use, and granularity. The present invention provides for fully automated rights management and authorization.

A data structure provided in accordance with the present invention divides works and rights. A first data file contains works. Each record in the works table includes information sufficient to identify one or more works managed by the system. A second data file contains rights. Each record in the rights table is associated with one or more works and may include up to three date fields, including a validity date field, an effective date field, and a permission date field. The function of these date fields is explained in the detailed description of the invention. In general, at least one date field is needed to account for the dynamic nature of rights.

To account for different types of use, the rights table may include a type of use field. This field identifies a particular right for which authorization is given (or withheld). For example, in a system for copyright clearance, the type of use may be the right to reproduce in the context of a university coursepack. A right to reproduce for commercial purposes may be withheld. This field may further include price information for the type of use, have a separate field for such information, or be linked to a separate table that provides such information.

To account for granularity, a work relation table may be added to show relationships between works. In a system for copyright clearance, this table could show, for example, that a photograph is embedded in an article, that a particular short story is printed in three different anthologies, or that a publisher offers a license to a collection of journals organized as a workset. The fields in this table and its functionality are explained in the detailed description of the invention.

Many other enhancements may be added. One such enhancement is the inclusion of a party table to provide detailed data about parties in the system. While parties will generally include all rights holders, parties may include any other individual, group, or organization with a relationship to the rights and authorizations managed by the system. This information may be used for client management, billing and payment, and aggregation functions. A second enhancement is the inclusion of an order table to provide a dynamic log of right authorizations and denials. Those of ordinary skill in the art will conceive of other enhancements to the system herein described.

A process for managing and authorizing rights according to the present invention manipulates this data structure with one or more software programs or tools for controlling and querying the data structure. Software is provided on the management side for performing work and right maintenance, such as adding, deleting, and editing entries. Software is also provided on the authorization side for querying the database to determine, for example, whether or not to authorize a particular use posed by a potential licensee.

A process according to the present invention may permit rightsholders themselves to add, delete, and edit rights through direct access to the rights management side of the system. A process according to the present invention may additionally or alternatively permit potential licensees to obtain (or be denied) authorizations through direct access to the rights authorization side of the system. Thus, unlike prior art systems, the present invention enables automated rights management and authorization. This process may be performed over a proprietary network, the Internet, or other suitable means.

BRIEF DESCRIPTION OF THE DRAWINGS

The above and further advantages of the invention may be better understood by referring to the following description in conjunction with the accompanying drawings in which.

DETAILED DESCRIPTION

1. Computer System

Figure 1:
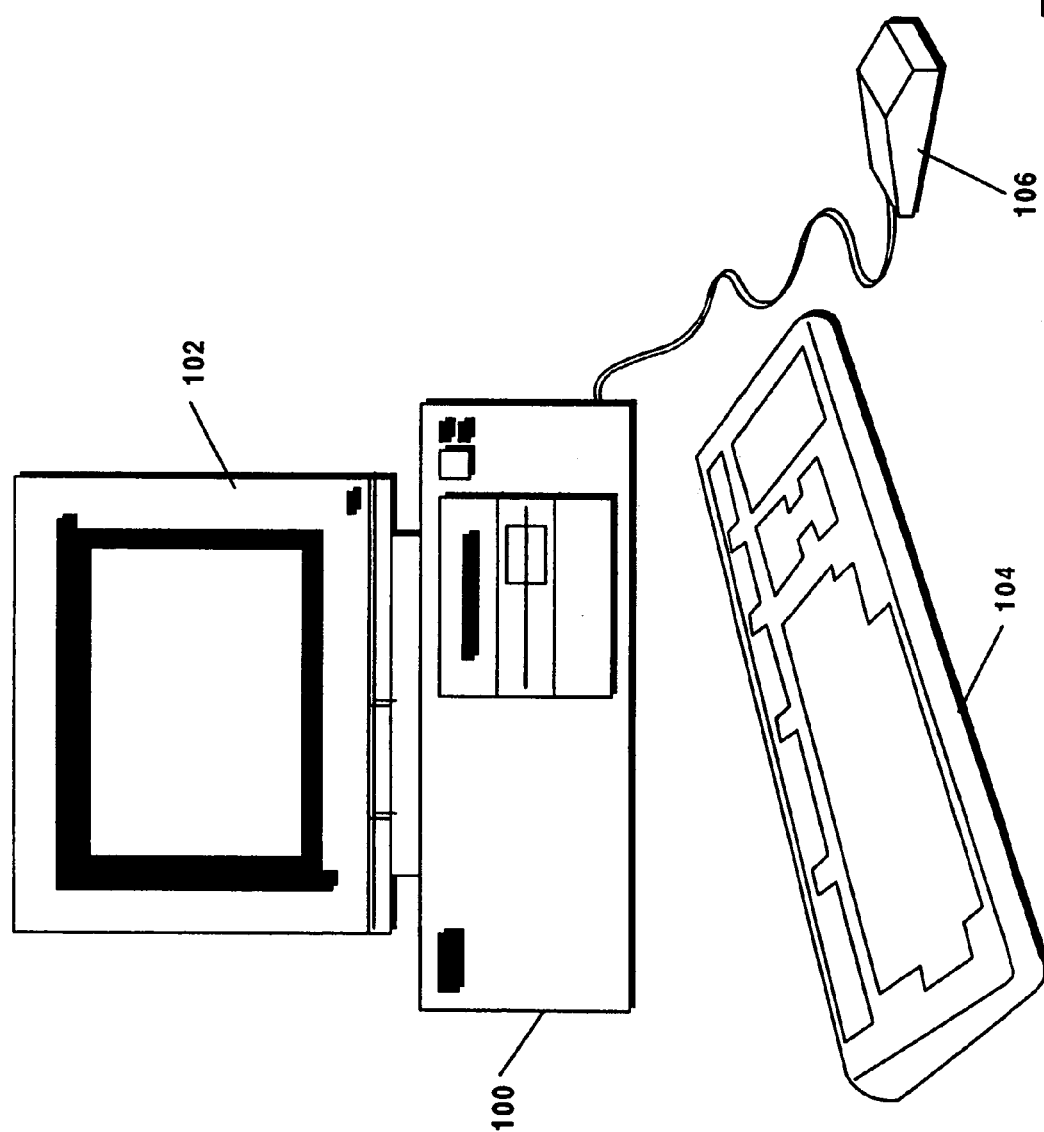
FIG. 1 shows an illustrative computer system to which the present invention applies.

FIG. 1 shows an illustrative computer system 100 to which the present invention applies. Computer system 100 contains data storage devices, a central processing unit, a power source, and connections for external devices. External devices typically connected to computer system 100 include one or more output devices, such as video monitor 102, and one or more input devices, such as keyboard 104 and pointing device 106. Computer system 100 may be any of several commercially available computer systems available from Apple, Compaq, Digital, Hewlett Packard, IBM and others. A successful prototype of the system has been developed using Digital Equipment Corporation's Alpha 2100 system, but initial commercial implementation of the system is anticipated to be on DEC's Alpha 8200 system. Those of ordinary skill in the art may select and implement the present invention on other computer systems.

Figure 2:
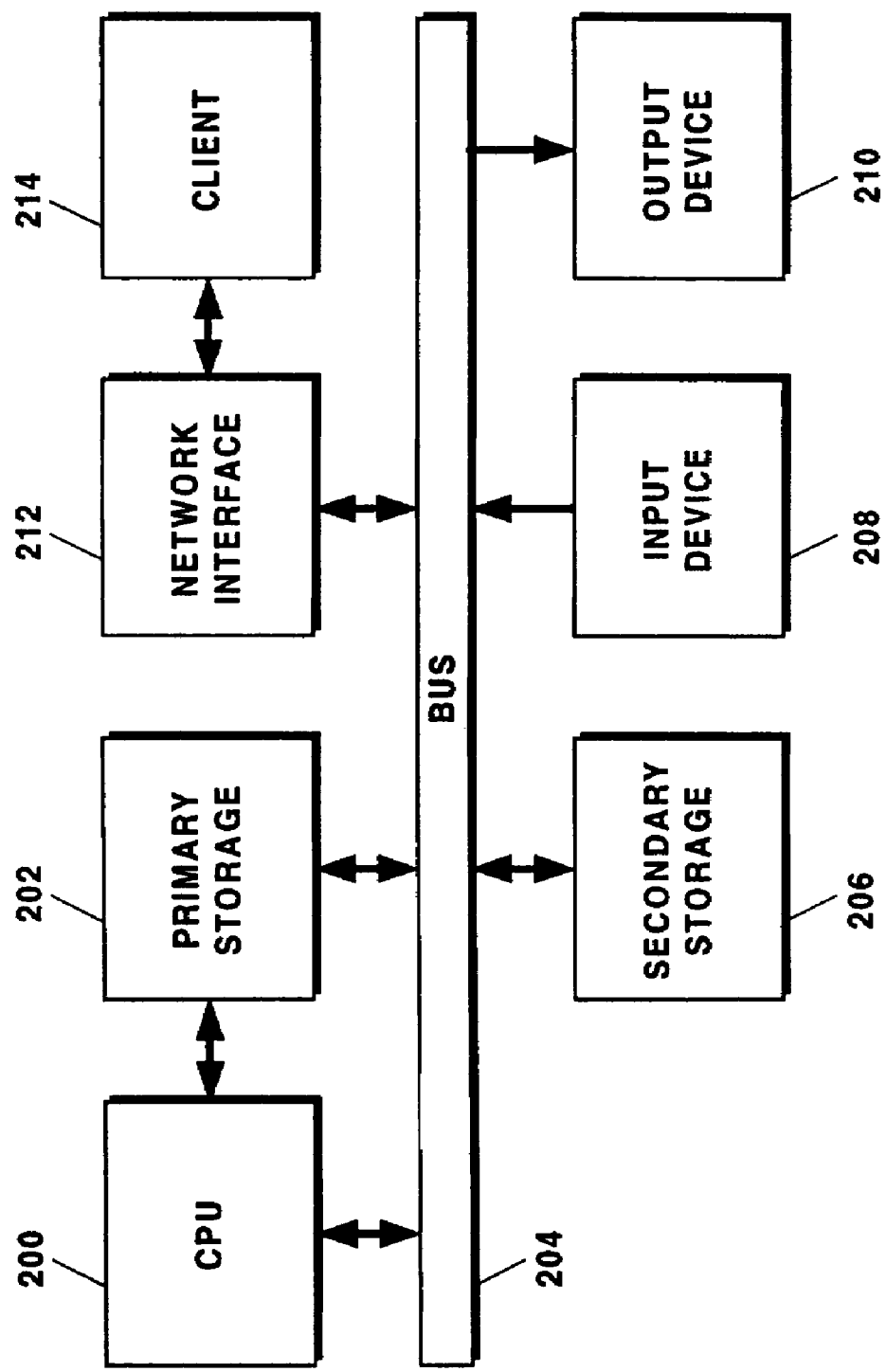
FIG. 2 shows a block diagram of the components of a computer system to which the present invention applies.

FIG. 2 shows a block diagram of the components of a computer system to which the present invention applies. Central processing unit 200 contains one or more microprocessors for executing the computer software programs necessary to implement the present invention. Central processing unit 200 is typically connected to primary storage 202 and system bus 204. Primary storage 202 is typically volatile storage, such as RAM. The programs and data for implementing the present invention are stored on a temporary basis in primary storage 202 during execution. Typically, only a portion of the programs and data fit in primary storage 202 at any particular time. Cache memory may also be included with central processing unit 200 or primary storage 202 to speed program execution.

System bus 204 connects the components of the computer system, and may be based on an open architecture, such as Peripheral Component Interconnect (PCI), or on a proprietary design. Several devices are connected to system bus 206. Secondary storage 206 is typically nonvolatile storage, such as an optical or magnetic disk drive. The programs and data for implementing the present invention are stored on a permanent basis in secondary storage 206. Input device 208 may include keyboard 104 or pointing device 106, and output device 210 may include video monitor 102. In some computer systems, input device 208 and output device 210 are connected directly to central processing unit 200, rather than through system bus 204.

While the computer system may be limited to the previous elements, the addition of network interface 212 and client 214 adds flexibility to the system and enables operation under the client/server model of computing. Network interface 212 may be a local-area or wide-area network card, a modem, a gateway to the Internet or an Internet service provider, or a similar interface. Client 214 may be a computer system similar to the one used to implement the present invention, or more typically, a low-cost personal computer of the type used in homes or offices.

2. First Illustrative Data Structure

Figure 3:
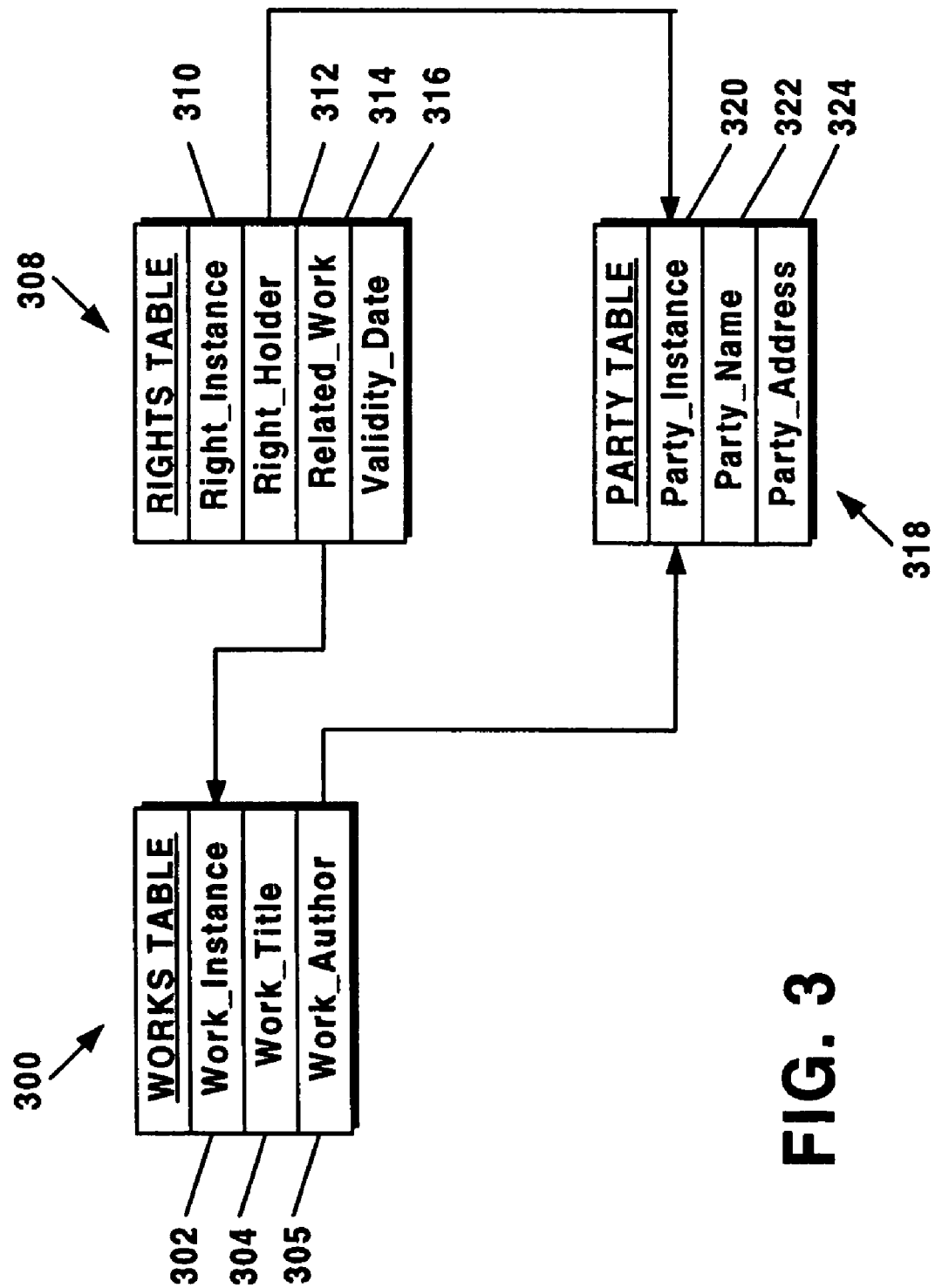
FIG. 3 shows a diagram of a first embodiment of a data structure contemplated by the present invention.

FIG. 3 shows a diagram of a first embodiment of a data structure contemplated by the present invention. This data structure may be used, for example, in a system for clearing rights to photographs. In this embodiment, it is assumed that all of the works are photographs and that the only right available for authorization is the right to duplicate. It is further assumed that some rights are held by photographers, while some rights are held by others. This embodiment of the invention could be used over a network service to offer and obtain rights to photographic images.

Works table 300 contains information about the works managed in the system. Here, these works are photographs. Information about each photograph is contained in one record in works table 300, where each record includes work_instance field 302, work_title field 304, and work_author field 306. Work_instance field 302 contains an identifier for a photograph. This identifier may be software generated or based on a standard classification scheme like the ISBN numbering scheme for written works. The identifier is generally numeric, but may also be symbolic or alphanumeric. Each identifier should be unique, so as to distinguish similarly titled and authored works. Work_title field 304 is an alphanumeric field that contains the title of the photograph. Work_author field 306 contains a reference or link to a party_instance field 320 of party table 318. This link identifies the work's photographer. In alternative embodiments, work_author field 306 may contain the name of the author if complete party information does not need to be maintained. This may arise, for example, with regard to works now in the public domain. For efficiency, works table 300 may be indexed or keyed on work_instance field 302 and other fields. In addition, works table 300 may include other fields, such as a field containing a bit-map or similarly-coded image of the photograph that may be viewed through an on-line service. Table 1 shows an illustrative works table containing two photographs titled, "Early Sunrise," and two other photographs.

TABLE 1

| Work_Instance | Work_Title | Work_Author |
| --- | --- | --- |
| W_1 | Early Sunrise | P_1 |
| W_2 | Fall Foliage | P_3 |
| W_3 | Spring Flowers | P_1 |
| W_4 | Early Sunrise | P_2 |

Rights table 308 contains information about the rights managed in the system. In this example, the only managed right is a duplication right, so this type of use is assumed (rather than specified in a separate field). Information about each right is contained in one record in rights table 308, where each record includes right_instance field 310, right_holder field 312, related_work field 314, and validity_date field 316. Right_instance field 310 contains an identifier for a right. This identifier will generally be assigned by the software and will generally be numeric. It is possible, though, to have other assignment protocols and to have symbolic or alphanumeric identifiers. Each identifier should be unique, so as to distinguish each right. Right_holder field 312 contains a reference or link to a party_instance field 320 in party table 318. This link identifies the right holder. Here, the right holder may be a photographer or some other party. Related_work field 314 contains a reference or link to a work_instance field 302 in works table 300. This link identifies the work to which the right pertains. Validity_date field 316 is a date field (or fields) setting forth the time period in which authorization is given to grant the right. For efficiency, rights table 308 may be indexed or keyed on right_instance field 310 and other fields. In addition, rights table 300 may include other fields, including those discussed in the second embodiment of this invention. Table 2 shows an illustrative rights table for the works shown in Table 1.

TABLE 2

| Right_Instance | Right_Holder | Related_Work | Validity_Date |
| --- | --- | --- | --- |
| R_1 | P_1 | W_1 | 1996-98 |
| R_2 | P_3 | W_2 | 1996-99 |
| R_3 | P_1 | W_3 | 1996-98 |
| R_4 | P_2 | W_4 | 1996-99 |
| R_5 | P_4 | W_1 | 1996-97 |
| R_6 | P_4 | W_4 | 1996-97 |

In Table 2, six rights are available. These rights include duplication rights from the photographers for the four works managed in the system. These rights are recorded in the records identified as R_1 through R_4. Two other rights are available. Record R_5 is for the first photograph titled, "Early Sunrise," and record R_6 is associated with the other photograph with this same name. Rights to both of these photographs are available from another right holder, identified as P_4. As shown later in Table 3, this right holder is Jones' Gallery, which acquired authorization rights to these photographs for 1996-97 in connection with an exhibition of "Early Sunrise" photographs.

Party table 318 contains information about the parties associated with the system. In alternative embodiments, the information in party table 318 may be stored directly in works table 300 and rights table 308. A separate table is used to conserve storage space where multiple records are associated with the same party. Information about each party is contained in one record in party table 318, where each record includes party_instance field 320, party_name 322, and party_address 324. Party_instance field 320 contains an identifier for a party. This identifier will generally be assigned by the software and will generally be numeric. It is possible, though, to have other assignment protocols and to have symbolic or alphanumeric identifiers. Each identifier should be unique, so as to distinguish each party. Party_name field 322 is an alphanumeric field that contains the party's name. Party_address field 324 is an alphanumeric field that contains the party's address. Party table 318 may include other fields pertinent to the parties. For efficiency, party table 318 may be indexed or keyed on party_instance field 320 and other fields. Table 3 shows an illustrative party table for the parties associated with Tables 1 and 2.

TABLE 3

| Party_Instance | Party_Name | Party_Address |
|---|---|---|
| P_1 | Lopez, David | Winter Street Anytown, USA 10000 |
| P_2 | Connor, Julie | Spring Street Anytown, USA 10000 |
| P_3 | Gregory, Eileen | Fall Drive Anytown, USA 10000 |
| P_4 | Jones' Gallery | Commerce Park Anytown, USA 10001 |

3. Second Illustrative Data Structure

Figure 4:
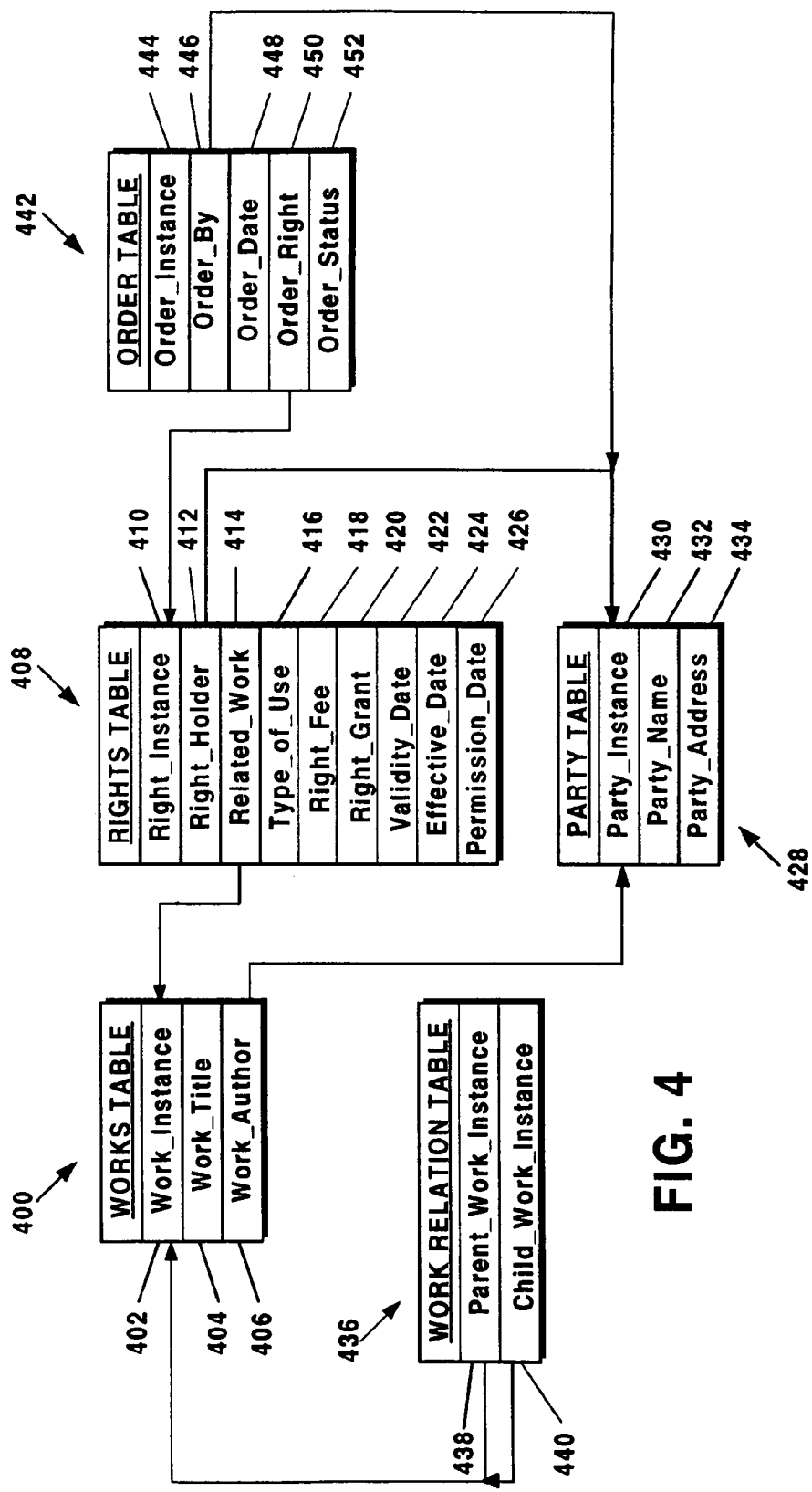
FIG. 4 shows a diagram of a second embodiment of a data structure contemplated by the present invention.

FIG. 4 shows a diagram of a second embodiment of a data structure contemplated by the present invention. This data structure may be used in a system for clearing rights to any type of work. These works may include anything subject to copyright or any similar right. A non-exclusive list of works includes written works, such as books, periodicals and their component parts; visual works, such as photographs and sculpture; audio works, such as music; audiovisual works, such as movies; and computer works, such as software programs and database compilations. This data structure may also be adapted for use with other types of interests, such as those in patents, trademarks, trade secrets, mask works, real property, personal property, contracts, or any other item that may be subject to conveyance, license, sale, or similar transaction.

The second embodiment of the data structure includes elements from the first embodiment of the data structure. Works table 400 and its work_instance field 402, work_title field 404 and work_author field 406 are similar in content and function to works table 300 and its three constituent fields. Works table 400, though, will typically include a larger variety of works. Party_table 428 and its party_instance field 430, party_name field 432 and party_address field 434 are similar in content and function to party table 318 and its constituent fields. Party table 400, though, will typically include a more diverse set of parties.

The second embodiment of the data structure includes several elements not found in the first embodiment of the data structure. While rights table 408 and its right_instance field 410, right_holder field 412, related_work field 414, and validity_date field 422 have similar content and serve a similar function as rights table 308 and its similarly-named fields, there are several new fields in rights table 408.

Type_of_use field 416 sets forth the type of use associated with the right. This field may be numeric or alphanumeric, linked to a separate table, or defined in some other way. This field captures, for example, the fact that a right concerns different customers (e.g., educational, not-for-profit, or commercial users), different media of use (e.g., paper, CD-ROM, intranet, or Internet), and different volumes of use (e.g., one copy, several copies, or an unlimited number of copies). Right_fee field 418 sets forth the fee associated with the right and type of use. This field may be a numeric field, contain a formula, or be defined in some other way. Right_grant field 420 is a boolean field that records whether or not a right may be granted. This field is used in response to inquiries for rights previously denied, to indicate that a denial is firm and not merely a new inquiry. This field is also used for archival purposes, to substantiate switches over time between authorization and denial for essentially identical rights.

In the second embodiment of the invention, two date fields in addition to validity_date field 422 are included in rights table 408. Effective_date field 424 is a date field (or fields) setting forth the time period for which a right is effective. The effective date may differ from the validity date. For example, a right may be effective as to material published in a periodical from 1985 through 1990, although this right is only valid to grant during 1995. A third date field, permission_date field 426, is a date field (or fields) setting forth the time period in which a potential licensee may exercise a right. In the above example, the rights holder may permit a license to be granted during 1995 for the 1985-90 material, which license may be exercised during the three year period from 1995 through 1997. The validity date is 1995; the effective date is 1985-90; and the permission date is 1995-97.

Table 4 shows a portion of a rights table for an illustrative authorization scheme. A right holder (record P_5 in party table 430) has a two year contract, entered Jan. 1, 1996, with an organizer of a rights management and authorization system. Under the contract, the organizer may grant three year licenses to make paper photocopies (designated as "R") of right holder's magazine (record W_9 in works table 400). During the first year of the contract, rights are offered at a base fee (designated as "B") of $1.00 plus a per page copy fee (designated as "P") of 5¢ per page. During the second year of the contract, rights are offered at a base fee of $1.10 plus 6¢ per page. If rights are obtained during the first year, the price is locked in at the first-year rate. Commercial entities (designated as "Com") are charged twice the fee of educational entities (designated as "Ed").

TABLE 4

| Right_Instance | Right_Holder | Related_Work | Type_of_Use | Right_Fee | Right_Grant | Validity_Date | Effective_Date | Permission_Date |
|---|---|---|---|---|---|---|---|---|
| R_10 | P_5 | W_9 | REd | B1000P005 | Yes | 1996 | All | 1996-98 |
| R_11 | P_5 | W_9 | REd | B110P006 | Yes | 1997 | All | 1997-99 |
| R_12 | P_5 | W_9 | RCom | B200P010 | Yes | 1996 | All | 1996-98 |
| R_13 | P_5 | W_9 | RCom | B220P012 | Yes | 1997 | All | 1997-99 |

The second embodiment of the data structure adds work relation table 436. Work relation table 436 accounts for granularity, where each record in the table includes parent_work_instance 438 and child_work_instance 440. Each of these fields contains a reference or link to a works_instance field 402 in works table 400. For efficiency, work relation table 436 may be indexed or keyed on either or both fields. In alternative embodiments, the data contained in work relation table 436 may be included directly in works_table 400.

Table 5 shows a works table, Table 6 shows a work relation table, and Table 7 shows an abridged rights table, which collectively illustrate the concept of granularity. The work titled, "The Golden Parakeet," is a children's story that is published on its own and contained in an anthology titled, "The Best Bedtime Stories of 1994." The story also includes an illustration titled, "The Winding River," by an artist other than the author of the story. The works table includes a second anthology of stories titled, "The Best Bedtime Stories of 1995." The publisher of the two anthologies offers a blanket license to the works, designated as "Bedtime Stories Work Set." As shown in Table 7, the only right available to the works in Table 5 is a right to reprint "The Bedtime Stories Work Set" on a per page fee.

TABLE 5

| Work_Instance | Work_Title | Work_Author |
|---|---|---|
| W_20 | The Golden Parakeet | P_10 |
| W_21 | The Winding River | P_11 |
| W_22 | The Best Bedtime Stories of 1994 | P_12 |
| W_23 | The Best Bedtime Stories of 1995 | P_12 |
| W_24 | Bedtime Stories Work Set | P_12 |

TABLE 6

| Parent_Work_Instance | Child_Work_Instance |
|---|---|
| W_20 | W_21 |
| W_22 | W_20 |
| W_24 | W_22 |
| W_24 | W_23 |

TABLE 7

| Right_Instance | Right_Holder | Related_Work |
|---|---|---|
| R_30 | P_12 | W_24 |

If a potential licensee seeks a right to reprint the illustration, "The Winding River," the following steps may be executed in authorization software. The work "The Winding River" is identified as record W_21 in Table 5. A search of the related_work field in Table 7 for W_21 finds no available rights. The software then moves up one level, to determine whether W_21 is contained in another work to which rights are available. A search of the child_work_instance field in Table 6 for W_21 finds that it is contained in W_20, the short story. A second search in Table 7 for W_20 again finds no available rights. Moving up another level, a search of Table 6 for W_20 finds that it is contained in W_22, the first anthology. A third search in Table 7 for W_22 again finds no available rights. Moving up another level, a search of Table 6 for W_22 finds that it is contained in W_24, the work set. A fourth search of Table 7 for W_24 finds that R_30 provide the necessary rights. Of course, depending on the rights inquiry, the search process may work in the opposite direction or through alternative but equivalent steps.

The second embodiment of the data structure includes order table 442. This table provides a dynamic log of right authorizations and denials, where each record includes several fields. Order_instance field 444 contains an identifier for an order. This identifier may be software generated or linked to a paper reference like a purchase order number. While the identifier may be numeric, symbolic, or alphanumeric, each identifier should be unique. Order by field 446 contains a reference or link to a party_instance field 430 of party table 428. This link identifies the party placing the order. Order_date field 448 is a date field for recording the date of the order. Order_right field 448 contains a reference or link to a right_instance field 410 of rights table 408. This link identifies the right ordered. Order_status field 452 may be used to track the status of an order. For efficiency, order table 442 may be indexed or keyed on order_instance field 444 and other fields. Typically, order table 442 will include other fields and structures to accommodate more complex transactions, such as multiple rights under a single purchase order.

4. Computer Software Programs

The data structure from above is combined with one or more software programs or tools for controlling and querying the data structure. Software is provided on the management side for performing work and right maintenance, such as adding, deleting, and editing entries. Software is also provided on the authorization side for querying the database to determine, for example, whether or not to authorize a particular use posed by a potential licensee. The computer software programs for controlling and querying the data structure may or may not be on the same physical data storage space as the data structure, and often will not be.

On the server side of the system for rights management, favorable results have been achieved with a prototype system based on Oracle Version 7.1.3 database software running under Open VMS on a DEC Alpha 2100. An initial commercial system is contemplated in which Oracle 7.2 is used on a DEC Alpha 8200. On the client side of the system for rights authorization, favorable results have been achieved using personal computers with Intel microprocessors and Microsoft operating systems running object-oriented applications built under PowerBuilder Version 4.0. Those of ordinary skill in the art may select and implement the present invention on other computer systems, and could quickly and easily construct a single-user model from a database system such as Access, dBase, FoxPro, or Quattro. It is contemplated that clients may connect to the server side of the system through Internet connections or some other type of on-line link, and communicate with the system through, for example, TCP/IP and/or DCE protocols, or their equivalent.

Figure 5:
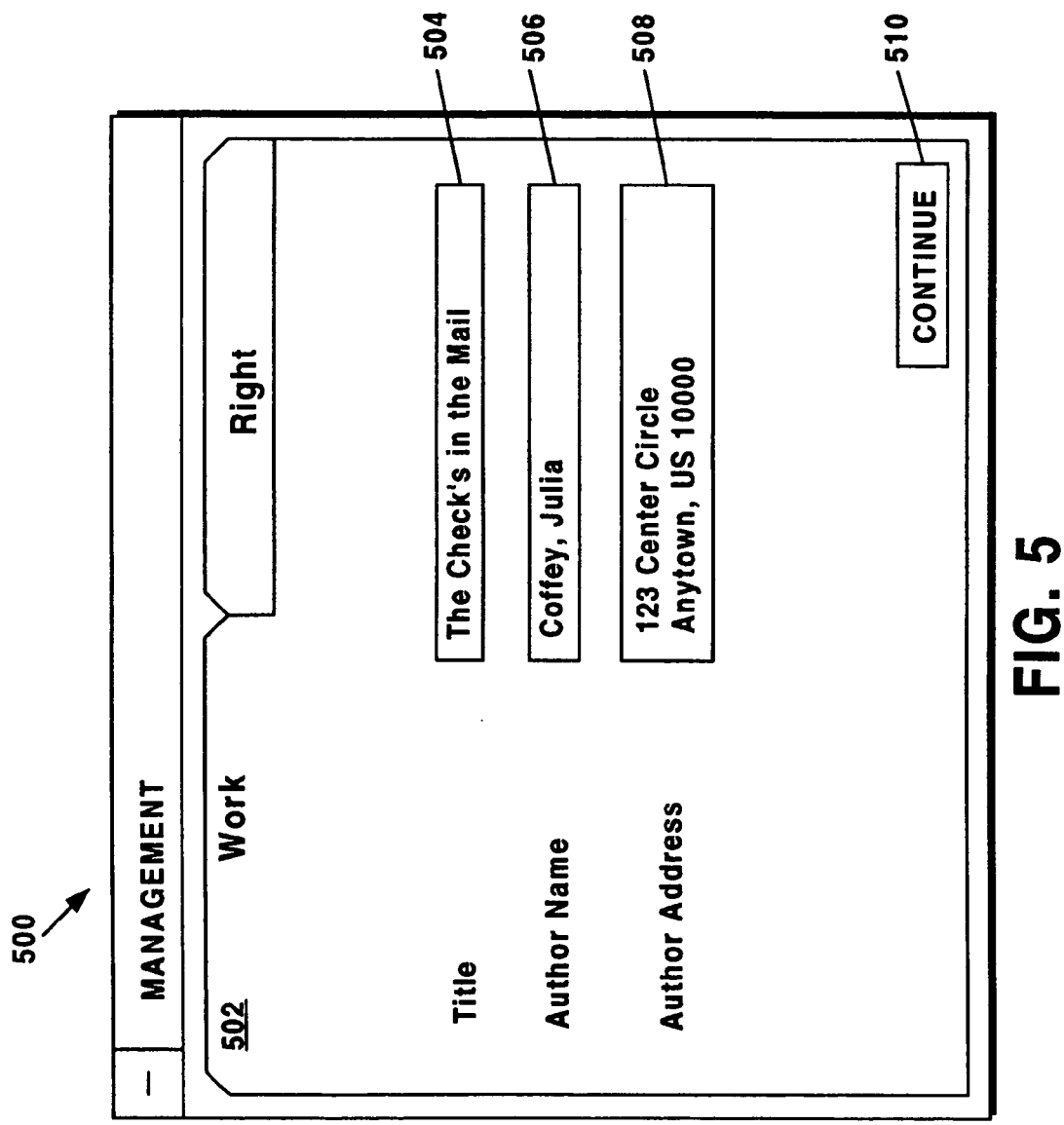
FIG. 5 shows an illustrative user interface for performing work management functions.

FIG. 5 shows an illustrative user interface 500 on the management side for performing work maintenance functions. User interface 500 includes a view of a constructive index card 502 on which information stored or associated with a record in the works table is recorded. Here, card 502 includes title field 504, author name field 506, and author address field 508. These fields store or control the data suggested by their names. Card 502 further includes continue button 510 for alerting the system that operations on a card have been completed. Typically, interface 500 would include drop down menus for, among other things, entering modes to find, add, delete, and edit records.

Figure 6:
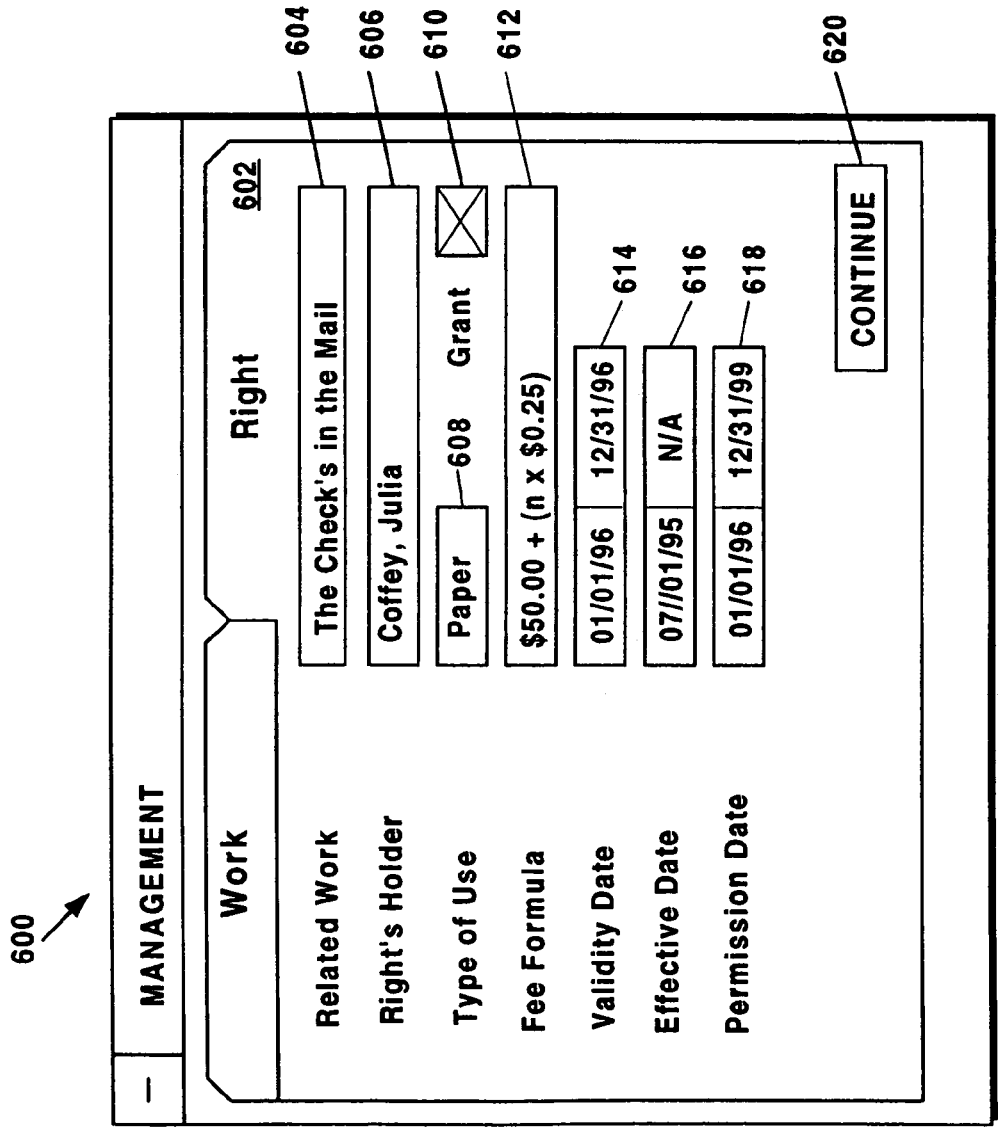
FIG. 6 shows an illustrative user interface for performing right management functions.

FIG. 6 shows an illustrative user interface 600 on the management side for performing right management functions. User interface 600 includes a view of a constructive index card 602 on which information stored or associated with a record in the rights table is recorded. Here, card 602 includes related work field 604, right holder field 606, type of use field 608, grant field 610, fee formula field 612, validity date field 614, effective date field 616, and permission date field 618. These fields store or control the data suggested by their names. Card 602 further includes continue button 610 for alerting the system that operations on a card have been completed. Typically, interface 600 would include drop down menus for, among other things, entering modes to find, add, delete, and edit records.

Figure 7:
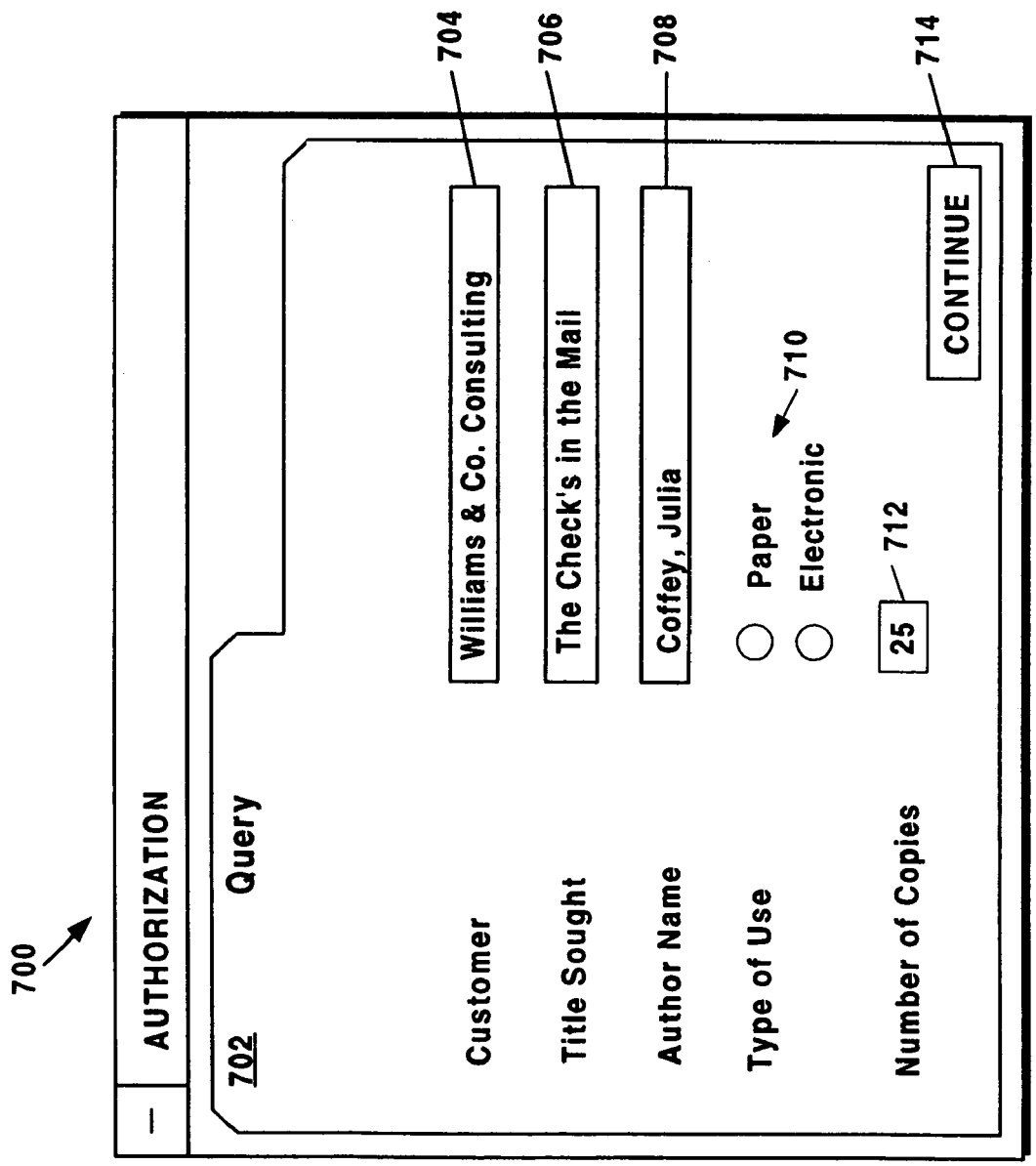
FIG. 7 shows an illustrative user interface for performing an authorization inquiry.

FIG. 7 shows an illustrative user interface 700 on the authorization side for performing authorization inquiries. User interface 700 includes a view of a constructive index card 702 to specify a particular right for which authorization is sought. Here, a potential licensee must identify himself, herself, or itself in customer field 704, specify a particular work for which authorization is sought in title field 706 and author field 708, and specify a type and volume of use, respectively, in type of use field 710 and number of copies field 712. After this information has been provided, a search may be performed upon activation of continue button 714. This search would determine whether or not authorization may be given, which information typically would be reported to the potential licensee along with price information and an order option. An illustrative search sequence is provided with the example given with Tables 5, 6, and 7, but those of ordinary skill in the art will devise other search sequences. A more sophisticated interface on the authorization side may change dynamically to require more or less information based on a potential licensee's input.

5. Other Embodiments

Although the invention has been shown and described in terms of two illustrative data structures and three user interfaces, those of ordinary skill in the art will realize that other data structures and interfaces may be constructed within the meaning of the present invention. Alternative data structures may be designed around rights similar to those considered in the two illustrative data structures, or for different rights. For example, in a patent, trademark, trade secret, or mask work licensing system, the equivalent of a works table may be used to record patents, trademarks, trade secrets, mask works, and related sets, while a rights table may store license, assignment, field of use, geographical scope, and similar rights and limitations for these items. In a real property management and authorization system, the equivalent of a works table may be used to record parcels of land, while a rights table may store interests in these parcels, such as leaseholds, mineral rights, riparian rights, air rights, easements, and other real property rights. In a general system for contract management and authorization, the equivalent of a works table may be used to record each contract or related set of contracts, while a rights table may store individual interests, rights, licenses, and sublicenses under the contracts. Those of ordinary skill in the art will also apply the teachings of the present invention to different data types, including database files, linked lists, multidimensional arrays, and other forms of data organization. Based on the software and system used, the specific rights management and authorization problem addressed, and design choices made by the programmer, alternative user interfaces will also be used. The key feature of the present invention is that a first data structure records the item or work, while a separate data structure records rights that are available in or to the items and works. Within this constraint, several embodiments of the invention may be constructed without departing from the spirit of the invention as claimed below.

What is claimed is:

1. Apparatus for managing time-limited orders for rights associated with a compound work that has other works with associated rights contained therein, the apparatus comprising:

a rights table with an entry for each right associated with the compound work, the entry containing permission date information that indicates a time period during which that right may be exercised;

a work relation table that has a record that relates each work that is contained in the compound work with the compound work;

an order table containing a record for each order and an indication whether a right requested by that order has been authorized or denied;

means responsive to an order requesting a right to a desired work and operable when the order is within the time period during which the right can be exercised and the right is available for the compound work for searching the work relation table to determine whether the desired work is contained in the compound work; and means responsive to a determination that the desired work is contained in the compound work for updating the order table to indicate that the right has been authorized or denied.

2. The apparatus of claim 1 wherein the order table contains information identifying a party that placed the order.

3. The apparatus of claim 2 further comprising a party table identifying rights holders, individuals, groups and organizations that have relationships to rights managed by the system.

4. The apparatus of claim 3 wherein the information in the order table that identifies the party points to a record in the party table that identifies a party that placed the order.

5. The apparatus of claim 1 wherein the rights table contains information identifying at least one holder of each right represented in the table.

6. The apparatus of claim 5 wherein the information in the rights table that identifies a right holder points to a record in the party table.

7. The apparatus of claim 1 wherein each record in the order table contains a date that an order was placed.

8. The apparatus of claim 7 wherein the means for searching the work table determines whether a date that an order was placed falls within the time period that the requested right can be exercised.

9. A method for managing time-limited orders for rights associated with a compound work that has other works with associated rights contained therein, the method for use in a computer system with a memory and comprising:

(a) creating in the memory a rights table with an entry for each right associated with the compound work, the entry containing permission date information that indicates a time period during which that right may be exercised;

(b) creating in the memory a work relation table that has a record that relates each work that is contained in the compound work with the compound work;

(c) creating in the memory an order table containing a record for each order and an indication whether a right requested by that order has been authorized or denied;

(d) in response to an order requesting a right to a desired work, checking whether the order is within the time period during which the right can be exercised and the right is available for the compound work and, if so, searching the work relation table to determine whether the desired work is contained in the compound work; and (e) in response to a determination that the desired work is contained in the compound work, updating the order table to indicate that the right has been authorized or denied.

10. The method of claim 9 wherein the order table contains information identifying a party that placed the order.

11. The method of claim 10 further comprising:
(f) creating in the memory a party table identifying rights holders, individuals, groups and organizations that have relationships to rights managed by the system.

12. The method of claim 11 wherein the information in the order table that identifies the party points to a record in the party table that identifies a party that placed the order.

13. The method of claim 9 wherein the rights table contains information identifying at least one holder of each right represented in the table.

14. The method of claim 13 wherein the information in the rights table that identifies a right holder points to a record in the party table.

15. The method of claim 9 wherein each record in the order table contains a date that an order was placed.

16. The method of claim 15 wherein step (d) comprises determining whether a date that an order was placed falls within the time period that the requested right can be exercised.

17. A computer program product for managing time-limited orders for rights associated with a compound work that has other works with associated rights contained therein, the computer program product for use in a computer system with a memory and comprising a computer usable medium having computer readable program code thereon, including:
program code for creating in the memory a rights table with an entry for each right associated with the compound work, the entry containing permission date information that indicates a time period during which that right may be exercised;
program code for creating in the memory a work relation table that has a record that relates each work that is contained in the compound work with the compound work;
program code for creating in the memory an order table containing a record for each order and an indication whether a right requested by that order has been authorized or denied;
program code operable in response to an order requesting a right to a desired work, for checking whether the order is within the time period during which the right can be exercised and the right is available for the compound work and, if so, for searching the work relation table to determine whether the desired work is contained in the compound work; and
program code operable in response to a determination that the desired work is contained in the compound work, for updating the order table to indicate that the right has been authorized or denied.

18. The computer program product of claim 17 wherein the order table contains information identifying a party that placed the order.

19. The computer program product of claim 18 further comprising:
program code for creating in the memory a party table identifying rights holders, individuals, groups and organizations that have relationships to rights managed by the system.

20. The computer program product of claim 19 wherein the information in the order table that identifies the party points to a record in the party table that identifies a party that placed the order.

21. Apparatus for managing orders for rights associated with works, the apparatus comprising:
a rights table with an entry for each right associated with the works;
a party table identifying rights holders, individuals, groups and organizations that have relationships to rights and authorizations managed by the apparatus;
an order table containing a record for each order, an indication whether a right requested by that order has been authorized or denied and information identifying a party in the party table that has a relationship to the authorization or denial; and
means responsive to an order requesting a right to a desired work for searching the rights table to determine whether the requested right is available and for updating the order table to indicate that the right has been authorized or denied and to include the party identifying information.

22. The apparatus of claim 21 wherein the party information is used for client management purposes.

23. The apparatus of claim 21 wherein the party information is used for billing and payment purposes.

24. The apparatus of claim 21 wherein the party information is used for aggregation functions.

25. Apparatus for managing orders for rights associated with works, the apparatus comprising:
a works table with an entry for each work;
a rights table with an entry for each right associated with each work;
a party table identifying rights holders, individuals, groups and organizations that have relationships to rights and authorizations managed by the apparatus;
means responsive to an order requesting a right to a desired work for searching the works table to obtain a work identifier;
means for using the work identifier to access the rights table to determine whether the requested right is available; and
means, operable when the right is available, for accessing the party table to determine individuals, groups and organizations that have relationships to the requested right.

26. The apparatus of claim 25 wherein information in the party table is used for client management purposes.

27. The apparatus of claim 25 wherein information in the party table is used for billing and payment purposes.

28. The apparatus of claim 25 wherein information in the party table is used for aggregation functions.

29. A computer-implemented method for managing orders for rights associated with works, the method comprising:
(a) constructing in a computer memory, a rights table with an entry for each right associated with the works;
(b) constructing in the computer memory, a party table identifying rights holders, individuals, groups and organizations that have relationships to rights and authorizations managed by the apparatus;
(c) constructing in the computer memory, an order table containing a record for each order, an indication whether a right requested by that order has been authorized or denied and information identifying a party in the party table that has a relationship to the authorization or denial; and
(d) in response to an order requesting a right to a desired work, searching the rights table to determine whether the requested right is available and updating the order table to indicate that the right has been authorized or denied and to include the party identifying information.

30. The method of claim 29 wherein the party information is used for client management purposes.

31. The method of claim 29 wherein the party information is used for billing and payment purposes.

32. The method of claim 29 wherein the party information is used for aggregation functions.

33. A computer-implemented method for managing orders for rights associated with works, the method comprising:
(a) constructing in a computer memory, a works table with an entry for each work;
(b) constructing in the computer memory, a rights table with an entry for each right associated with each work;
(c) constructing in the computer memory, a party table identifying rights holders, individuals, groups and organizations that have relationships to rights and authorizations managed by the apparatus;
(d) in response to an order requesting a right to a desired work, searching the works table to obtain a work identifier;
(e) using the work identifier to access the rights table to determine whether the requested right is available; and
(f) when the right is available, accessing the party table to determine individuals, groups and organizations that have relationships to the requested right.

34. The method of claim 33 wherein information in the party table is used for client management purposes.

35. The method of claim 33 wherein information in the party table is used for billing and payment purposes.

36. The method of claim 33 wherein information in the party table is used for aggregation functions.

37. A computer program product for managing orders for rights associated with works, the computer program product comprising a computer usable medium having computer-readable program code thereon, including:
program code for constructing in a computer memory, a rights table with an entry for each right associated with the works;
program code for constructing in the computer memory, a party table identifying rights holders, individuals, groups and organizations that have relationships to rights and authorizations managed by the apparatus;
program code for constructing in the computer memory, an order table containing a record for each order, an indication whether a right requested by that order has been authorized or denied and information identifying a party in the party table that has a relationship to the authorization or denial; and
program code, operable in response to an order requesting a right to a desired work, for searching the rights table to determine whether the requested right is available and for updating the order table to indicate that the right has been authorized or denied and to include the party identifying information.

38. The computer program product of claim 37 wherein the party information is used for client management purposes.

39. The computer program product of claim 37 wherein the party information is used for billing and payment purposes.

40. The computer program product of claim 37 wherein the party information is used for aggregation functions.

41. A computer program product for managing orders for rights associated with works, the computer program product comprising a computer usable medium having computer readable program code thereon, including:
program code for constructing in a computer memory, a works table with an entry for each work;
program code for constructing in the computer memory, a rights table with an entry for each right associated with each work;
program code for constructing in the computer memory, a party table identifying rights holders, individuals, groups and organizations that have relationships to rights and authorizations managed by the apparatus;
program code, operable in response to an order requesting a right to a desired work, for searching the works table to obtain a work identifier;
program code that uses using the work identifier to access the rights table to determine whether the requested right is available; and
program code, operable when the right is available, for accessing the party table to determine individuals, groups and organizations that have relationships to the requested right.

42. The computer program product of claim 41 wherein information in the party table is used for client management purposes.

43. The computer program product of claim 41 wherein information in the party table is used for billing and payment purposes.

44. The computer program product of claim 41 wherein information in the party table is used for aggregation functions.

* * * * *